Dec. 18, 1951    J. R. SCHEIB    2,579,207
SLIDE FASTENER TOOL
Filed June 27, 1946
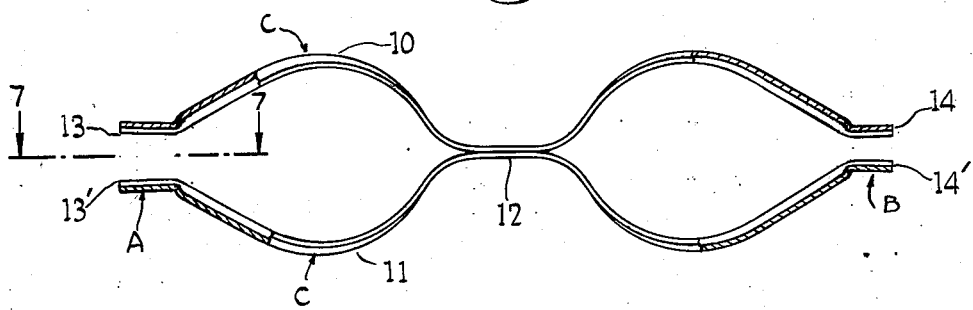
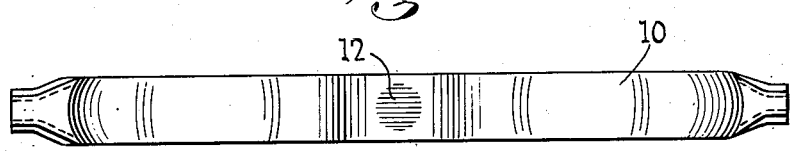
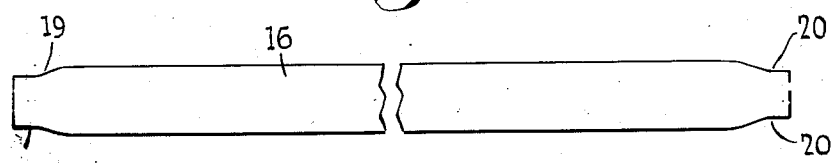
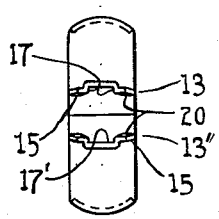
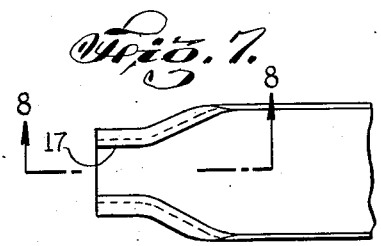
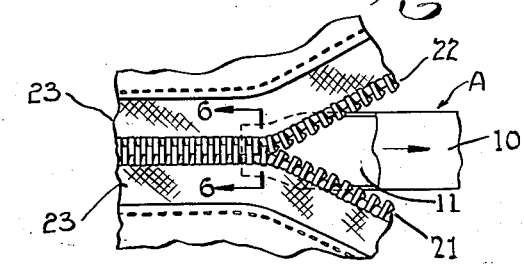
INVENTOR.
JOHN R. SCHEIB
BY
Hammond & Littell
ATTORNEYS Patented Dec. 18, 1951

2,579,207

UNITED STATES PATENT OFFICE 2,579,207

SLIDE FASTENER TOOL

John R. Scheib, Lakewood, N. J.

Application June 27, 1946, Serial No. 679,744

2 Claims. (Cl. 81—3)

This invention relates to separable or slide fasteners and particularly to a repair tool for said fasteners. Slide fasteners, commonly referred to as "zippers," are employed for many articles in general use such as garments, luggage, covers of various kinds, etc. Frequently the interengaging fastener elements or teeth accidentally become separated at one or several points along the fastener and in such an event, the teeth along the separated portion must be reengaged. The slides or other elements of the fastener sometimes require repair or the tapes and individual teeth become damaged, in which case the repair can be made with greater facility with the fastener separated and after which the fastener must be reassembled. Because of the smallness of the parts and the manner in which the interengaging teeth of the fastener fit together, it is extremely difficult to reengage the teeth without special tools and, as a result, many articles are discarded until a new fastener can be obtained, or the articles are discarded permanently.

One of the objects of this invention is to provide an easily constructed tool for the repair or reengagement of the teeth of a separated slide fastener, the tool being operable by the average person without special skill.

Another object of the invention is to provide a repair tool which may be used with different size fasteners and which will properly guide the teeth into engagement with each other and firmly will grip the tape supporting the teeth during the reengaging operation.

Still another object of the invention is to provide a means and method for forming the elements of the tool from flat strips of metal in a facile and economical manner.

These and other objects of the invention will become apparent from the following description and drawings which are merely exemplary.

In the drawings:

Fig. 1 shows a side view of one form of the invention, portions being in section.

Fig. 2 is a top view of the device of Fig. 1.

Fig. 3 is an end view looking from the left of Fig. 1.

Fig. 4 is a broken view of the top of a blank before it has the channels formed thereon.

Fig. 5 is a fragmentary illustrative sketch showing the operation of one end of the tool.

Fig. 6 is an enlarged sectional view along the line 6—6 of Fig. 5.

Fig. 7 is an enlarged fragmentary view of one of the channels looking in the direction 7—7 of Fig. 1.

Fig. 8 is a fragmentary sectional view taken along the line 8—8 of Fig. 7.

In general, the tool in its preferred form comprises a pair of resilient carriers or strips which are joined intermediate their ends, there being a mating pair of slide fastener engaging channel elements at each end of the tool. The channels are shaped so that when they are brought together on opposite sides of the fastener, the fastener teeth will be guided together at the correct angle for proper engagement with each other as the tool is operated.

As an example of one manner in which the tool can be used, the repair of a "zipper" wherein the slider has been damaged, or must be removed, will be described. The two sides of the "zipper" are completely disengaged after the top stops and the slider stops have been removed and the slider then can be repaired or a new one procured. The appropriate end of the tool then is selected and the first elements of the "zipper" laid in one of the channels and the mating channel at the selected end of the tool pressed toward the first by grasping the resilient carrier portion of the tool. The exact method in which the fastener elements are engaged by the channels is, of course, variable with the wishes of the operator or the particular problem involved. The tool then is drawn the length of the "zipper" with the channels pressed firmly toward each other so as to interengage all of the teeth of the "zipper." The tool then can be removed and the repaired or new slider slid over the engaged "zipper."

Another example of use of the tool is one wherein a portion of the "zipper" has become disengaged in which case the tool can be slipped over the fastener to the engaged elements just before the separated portion and then the tool drawn along the "zipper" to reengage the separated teeth.

Other examples of the use of the tool include reassembly of a "zipper" which has been separated so that a loose tooth can be tightened. A new "zipper" can be applied with greater ease and neater if the elements thereof are first separated and then sewn on the article. The tool then can be used to reassemble the fastener. There are, of course, other ways in which the tool can be employed which will become apparent to a user of the tool.

Referring to Fig. 1, the tool comprises carrier strips 10 and 11, these being joined at the center 12 by spot welding, riveting, or in any desired way. The strips may be made of spring steel, brass, plastic, or any other suitable material, and it also is evident that the tool may be made from a single piece of metal or that a separator (not shown) can be placed between the members at 12 if desired.

At one end A of the tool, mating channels 13, 13' are provided to engage one size of "zipper" to be operated upon and at the other end B mating channels 14, 14' are provided which may be of a different size than the channels 13, 13'. The sets of channels 13, 13' and 14, 14' with their flanges 15 are made by forming them from a blank strip 16 (Fig. 4). The shape of the channels is such as to guide the slide fastener interlocking elements or teeth at the proper angle so that they will engage with each other, such as shown in Fig. 5, as will be explained hereafter. In the form of tool shown, the channels normally are held in separated position by the carriers but it is evident that they might be normally in closed position and separable by hand as the channels are slipped over or removed from the slide fastener.

In the preferred form of the device, the portions of the carrier strips between the center of the tool and the channels can be curved in cross-section so that the strips have the desired stiffness and yet have the requisite resiliency.

As may be seen in Figs. 6 and 7, the channels and flanges preferably are formed by embossing, stamping, or other operation in a manner so as to produce the interior channel surface 17, 17' and flanges 15 therefrom. Inside surfaces 17, 17' of the channels are the engaging surfaces for the interengaging elements or teeth of the slide fastener.

As can be seen in Fig. 4, a flat blank 16 may be provided having ears 19 and 20 extending therefrom, the size of ears 19 and ears 20 at the opposite end being such as to allow the ends of the strips to be formed into a channel and flanges of proper height, width, and size.

The flat portions or faces 29 of the flanges 15 of the channels are made of sufficient width to engage the tape and position the same so as to properly cause engagement of the elements as the tool is drawn along the length of the "zipper" in a closing operation. This is particularly of importance in the smooth operation of the tool.

As described generally previously, one end of the tool, such as A (Figs. 1 and 5) is placed over a closed portion of the slide fastener or at the beginning thereof (Fig. 5). The portions C—C (Fig. 1) of the tool are firmly pressed together so that the mating channels 13, 13' will tightly engage both sides of the slide fastener elements. The tool then can be drawn to the right (Fig. 5) and the slide fastener elements will be interengaged with each other so as to close the separated portion of the "zipper."

In Fig. 5, the slide fastener tape is indicated at 23 and the interengageable elements at 21 and 22, as is well known in the slide fastener art. It is apparent that when a slide fastener of a different size than that for which end A of the tool is designed, end B of the tool may be used for the purpose of repairing the fastener, channels 14, 14' being made the proper size for the purpose.

The wide faces 29 of the flanges of the channels 15 will tightly engage opposite faces of the tape 23 (Fig. 6) with the teeth positioned for guidance by the channel surfaces 17, 17'. In this manner, the tapes are firmly held and guided as the tool is drawn along the "zipper" to close the same. Merely by way of example, the width of the faces 29 and flanges 15 may be made about $\frac{1}{8}$" to $\frac{3}{64}$" when the closing end of the channel has a width of between $\frac{9}{64}$" and $\frac{15}{64}$" with the leading width of the channel between $\frac{13}{32}$" and $\frac{15}{32}$", respectively.

The tool described herein provides a universal device which can be used by the average person in the repair and servicing of slide fasteners, thus giving a means whereby many articles previously permanently or temporarily discarded can be rapidly repaired. A method and means of construction of such a tool also is disclosed so that a tool can be manufactured economically and easily.

Various modifications may be made to the described device and method without departing from the spirit of the invention as set forth in the appended claims.

I claim:

1. In a slide fastener repair tool, the combination including a pair of resilient strips having one set of ends juxtapositioned and normally separated relative to each other, means joining said strips at a position remote from said juxtapositioned ends, and formed open channels integral with each strip at said juxtapositioned ends and having their recesses facing each other, said channels having substantially parallel converging slide fastener teeth engaging walls and exteriorly projecting tape engaging flanges adjacent said teeth engaging walls and substantially perpendicular thereto, said tape engaging flanges firmly holding said tape as the closed channels move along a separated fastener to close the teeth thereof, said flanges having tape engaging surfaces having an effective width in the range of $\frac{3}{64}$" when the closing width of the channel is in the order of between $\frac{9}{64}$" and $\frac{15}{64}$" and the leading width of the channel is in the order of between $\frac{13}{32}$" and $\frac{15}{32}$".

2. In a slide fastener repair tool, the combination including a pair of resilient strips having one set of ends juxtapositioned and normally separated relative to each other, means joining said strips at a position remote from said juxtapositioned ends, intermediate portions of the strips being bowed outwardly relative to each other and having a stiffening non-linear transverse section, and formed open channels integral with each strip at said juxtapositioned ends and having their recesses facing each other, said channels having substantially parallel converging slide fastener teeth engaging walls and exteriorly projecting tape engaging flanges adjacent said teeth engaging walls and substantially perpendicular thereto, said tape engaging flanges firmly holding said tape as the closed channels move along a separated fastener to close the teeth thereof, said flanges having tape engaging surfaces having an effective width in the range of $\frac{3}{64}$" when the closing width of the channel is in the order of between $\frac{9}{64}$" and $\frac{15}{64}$" and the leading width of the channel is in the order of between $\frac{13}{32}$" and $\frac{15}{32}$".

JOHN R. SCHEIB.

REFERENCES CITED

The following references are of record in the file of this patent:

UNITED STATES PATENTS

| Number | Name | Date |
|---|---|---|
| 390,260 | Seewald | Oct. 2, 1888 |
| 458,546 | Fisher | Aug. 25, 1891 |
| 759,708 | Hart | May 10, 1904 |
| 1,293,079 | Gastrom et al. | Feb. 4, 1919 |
| 1,452,372 | Gomez | Apr. 17, 1923 |
| 1,510,254 | Boyle | Sept. 30, 1924 |
| 1,711,692 | Robinson | May 7, 1929 |
| 1,739,715 | Eckland | Dec. 17, 1929 |
| 1,740,591 | Harter | Dec. 24, 1929 |
| 1,970,137 | Harte | Aug. 14, 1934 |
| 2,136,302 | Moser | Nov. 15, 1938 |
| 2,334,252 | Darling | Nov. 16, 1943 |

FOREIGN PATENTS

| Number | Country | Date |
|---|---|---|
| 557,805 | Germany | Aug. 27, 1932 |